(12) United States Patent
Hanquez et al.

(10) Patent No.: US 8,352,952 B2
(45) Date of Patent: Jan. 8, 2013

(54) SYSTEMS AND METHODS FOR FACILITATING VIRTUALIZATION OF A HETEROGENEOUS PROCESSOR POOL

(75) Inventors: Vincent Hanquez, Cambridge (GB); Jonathan James Ludlam, Cambridgeshire (GB); Richard William Sharp, Cambridgeshire (GB); David Jonathan Scott, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 1072 days.

(21) Appl. No.: 12/325,710

(22) Filed: Dec. 1, 2008

(65) Prior Publication Data

US 2010/0138828 A1 Jun. 3, 2010

(51) Int. Cl.
*G06F 9/50* (2006.01)
(52) U.S. Cl. .............. 718/104; 718/1; 718/102
(58) Field of Classification Search .............. 718/1, 102, 718/104
See application file for complete search history.

(56) References Cited

U.S. PATENT DOCUMENTS

| | | | | |
|---|---|---|---|---|
| 3,643,227 A * | 2/1972 | Smith et al. | ................... | 718/105 |
| 5,115,505 A * | 5/1992 | Bishop et al. | ................. | 718/104 |
| 5,317,568 A * | 5/1994 | Bixby et al. | .................. | 370/401 |
| 5,473,608 A * | 12/1995 | Gagne et al. | ................... | 370/401 |
| 5,517,622 A * | 5/1996 | Ivanoff et al. | ................. | 709/232 |
| 5,640,503 A * | 6/1997 | Alpert et al. | ................... | 712/227 |
| 5,925,125 A * | 7/1999 | Alpert et al. | ................... | 712/244 |
| 7,007,183 B2 * | 2/2006 | Rawson, III | ................... | 713/324 |
| 7,194,641 B2 * | 3/2007 | Hack | .............................. | 713/300 |
| 7,290,259 B2 * | 10/2007 | Tanaka et al. | ..................... | 718/1 |
| 7,617,375 B2 * | 11/2009 | Flemming et al. | ............ | 711/173 |
| 7,698,530 B2 * | 4/2010 | Flemming et al. | ............ | 711/173 |
| 7,698,531 B2 * | 4/2010 | Flemming et al. | ............ | 711/173 |
| 7,711,858 B2 * | 5/2010 | Ofer et al. | ......................... | 710/6 |
| 7,717,350 B2 * | 5/2010 | Ober et al. | ..................... | 235/492 |
| 7,840,775 B2 * | 11/2010 | Shimada | ....................... | 711/173 |
| 7,987,464 B2 * | 7/2011 | Day et al. | ....................... | 718/104 |
| 2008/0004012 A1 * | 1/2008 | Polzin et al. | ............... | 455/435.1 |
| 2008/0034366 A1 * | 2/2008 | Tanaka et al. | ..................... | 718/1 |
| 2008/0183944 A1 * | 7/2008 | Thornton et al. | ................. | 711/6 |
| 2008/0244213 A1 * | 10/2008 | Flemming et al. | ............ | 711/173 |
| 2008/0244214 A1 * | 10/2008 | Flemming et al. | ............ | 711/173 |
| 2008/0244215 A1 * | 10/2008 | Flemming et al. | ............ | 711/173 |

FOREIGN PATENT DOCUMENTS

JP 2004192612 A * 7/2004

OTHER PUBLICATIONS dictionary.com, © 2012, Random House, Inc. search term: functionality, pp. 1.*

(Continued)

*Primary Examiner* — Aimee Li
(74) *Attorney, Agent, or Firm* — Foley and Lardner LLP; John D. Lanza

(57) ABSTRACT

A system for facilitating virtualization of a heterogeneous processor pool includes a processor allocation component and a hypervisor, each executing on a host computer. The processor allocation component identifies a plurality of physical processors available for computing and determines a set of flags, each of the set of flags identifying a type of functionality provided by each of a subset of the plurality of physical processors. The hypervisor, in communication with the processor allocation component, allocates, to at least one virtual machine, access to one of the subset of the plurality of physical processors.

13 Claims, 7 Drawing Sheets

OTHER PUBLICATIONS

Anonymous: "Live Migration with AMD-V Extended Migration Technology" Internet Article, [Online] Apr. 2008, pp. 1-17, XP002568513 Retrieved from the Internet: URL:http://developer.amd.com/assets/437813.00-PUB_Live-Virtual-Machine-Migration-on-AMD-processors.pdf> [retrieved on Feb. 10, 2010] the whole document.

Anonymous: "VMware VMotion and CPU 1-18 Compatibility" Internet Article, [Online] Aug. 4, 2008, pp. 1-14, XP002568512 Retrieved from the Internet: URL:http://web.archive.org/web/20080804071052/http://www.vmware.com/files/pdf/vmotion_info_guide.pdf> [retrieved on Feb. 12, 2010] pp. 1-7.

European Communication on 09775012.9 dated Jul. 11, 2011.
European Examination Report on 09775012.9 dated Mar. 16, 2012.
Hausner M: "VMotion between Apples and Oranges—Understanding CPU Compatibility Constraints for VMware VMotion" Internet Article, [Online] Nov. 2006, pp. 1-34, XP002568514 Retrieved from the Internet: URL:http://download3.vmware.com/vmworld/2006/tacl356.pdf> [retrieved on Feb. 12, 2010.
International Preliminary Report on Patentability on PCT/US2009/065105 dated Jun. 16, 2011.
International Search Report on PCT/US2009/065105 dated Feb. 23, 2010.
Written Opinion on PCT/US2009/065105 dated Feb. 23, 2010.

* cited by examiner

SYSTEMS AND METHODS FOR FACILITATING VIRTUALIZATION OF A HETEROGENEOUS PROCESSOR POOL

FIELD OF THE DISCLOSURE

This disclosure generally relates to systems and methods for virtualizing physical resources provided by a computing device. In particular, this disclosure relates to systems and methods for facilitating virtualization of a heterogeneous processor pool.

BACKGROUND OF THE DISCLOSURE

In conventional computing environments implementing a hypervisor to execute a virtual machine on a host computing device, the hypervisor may provide the virtual machine with access to hardware resources provided by at least one physical computing device. The hypervisor may allocate physical resources from a pool of physical computing devices, which may include heterogeneous processors providing different levels of functionality. In some environments, a hypervisor may need to migrate a virtual machine from one physical computing device to a second physical computing device; for example, when the first physical computing device requires maintenance or no longer has the capacity to provide the virtual machine with the allocated hardware resources. In the event that the two physical computing devices provide different functionality—for example, heterogeneous processor functionality—the migration of the virtual machine from the first physical computing device to the second may fail. For example, the virtual machine may execute a process requiring access to functionality provided by the first physical computing device but not by the second and a migration of the virtual machine may result in unanticipated execution errors or undesired termination of the virtual machine.

Conventional solutions to this problem typically involve providing homogeneous functionality in the pool of physical computing devices. However, this approach typically limits an administrator's ability to provide a diverse range of functionality for users. Furthermore, as physical resources age and require replacement, administrators may not be able to find replacement devices that provide identical functionality.

BRIEF SUMMARY OF THE DISCLOSURE

In one aspect, a method for facilitating virtualization of a heterogeneous processor pool includes identifying a plurality of physical processors available for computing. The method includes determining a set of flags, each of the set of flags identifying a type of functionality provided by each of a subset of the plurality of physical processors. The method includes allocating, by a hypervisor to at least one virtual machine, access to one of the subset of the plurality of physical processors. In one embodiment, the method includes providing, by a hypervisor, a virtual processor in the at least one virtual machine, the virtual processor implementing only functionality identified by the set of flags. In another embodiment, the method includes determining, in response to a command received from a user, the set of flags.

In another aspect, a system for facilitating virtualization of a heterogeneous processor pool includes a processor allocation component and a hypervisor, each executing on a host computer. The processor allocation component identifies a plurality of physical processors available for computing and determining a set of flags, each of the set of flags identifying a type of functionality provided by each of a subset of the plurality of physical processors, the processor allocation component executing on a host computer. The hypervisor executes on the host computer and, in communication with the processor allocation component, allocates, to at least one virtual machine, access to one of the subset of the plurality of physical processors. In one embodiment, the plurality of physical processors is distributed across a plurality of physical machines. In another embodiment, the system includes a virtual processor, within the at least one virtual machine, the virtual processor implementing only functionality identified by the set of flags.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
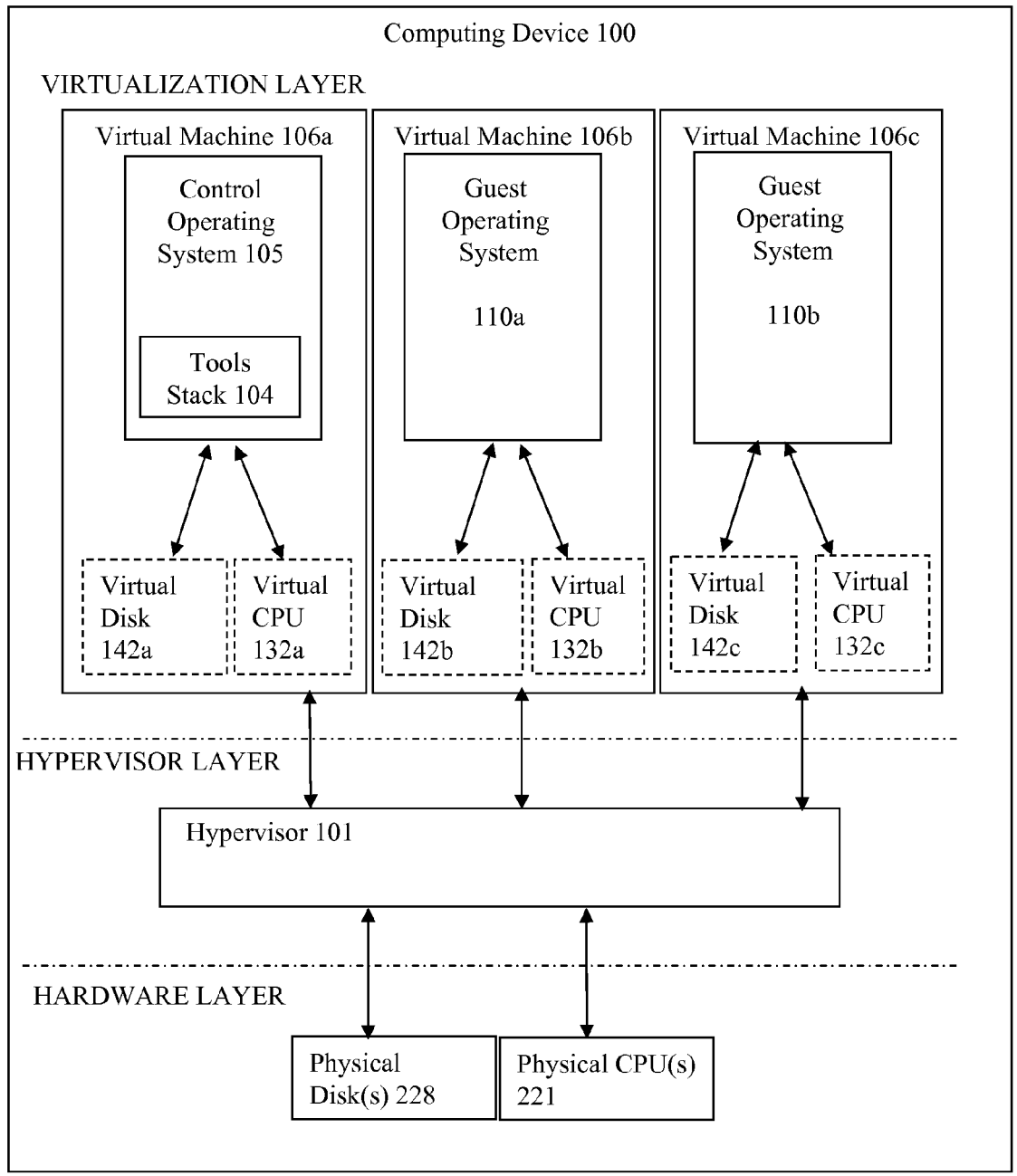
FIG. 1A is a block diagram depicting an embodiment of a computing environment comprising a hypervisor layer, a virtualization layer, and a hardware layer.

Referring now to FIG. 1A, a block diagram depicts one embodiment of a virtualization environment. In brief overview, a computing device 100 includes a hypervisor layer, a virtualization layer, and a hardware layer. The hypervisor layer includes a hypervisor 101 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 110 and a plurality of virtual resources allocated to the at least one operating system 110, which may include a plurality of virtual processors 132a, 132b, 132c (generally 132), and/or virtual disks 142a, 142b, 142c (generally 142). The plurality of virtual resources and the operating system 110 may be referred to as a virtual machine 106. A virtual machine 106 may include a control operating system 105 in communication with the hypervisor 101 and used to execute applications for managing and configuring other virtual machines on the computing device 100.

Referring now to FIG. 1A, and in greater detail, a hypervisor 101 may provide virtual resources to an operating system in any manner which simulates the operating system having access to a physical device. A hypervisor 101 may provide virtual resources to any number of guest operating systems 110a, 110b (generally 110). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor which creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 101 executes within an operating system executing on a computing device. In one of these embodiments, a computing device executing an operating system and a hypervisor 101 may be said to have a host operating system (the operating system executing on the computing device), and a guest operating system (an operating system executing within a computing resource partition provided by the hypervisor 101). In other embodiments, a hypervisor 101 interacts directly with hardware on a computing device, instead of executing on a host operating system. In one of these embodiments, the hypervisor 101 may be said to be executing on "bare metal," referring to the hardware comprising the computing device.

In some embodiments, a hypervisor 101 may create a virtual machine 106a-c (generally 106) in which an operating system 110 executes. In one of these embodiments, for example, the hypervisor 101 loads a virtual machine image to create a virtual machine 106. In another of these embodiments, the hypervisor 101 executes an operating system 110 within the virtual machine 106. In still another of these embodiments, the virtual machine 106 executes an operating system 110.

In some embodiments, the hypervisor 101 controls processor scheduling and memory partitioning for a virtual machine 106 executing on the computing device 100. In one of these embodiments, the hypervisor 101 controls the execution of at least one virtual machine 106. In another of these embodiments, the hypervisor 101 presents at least one virtual machine 106 with an abstraction of at least one hardware resource provided by the computing device 100. In other embodiments, the hypervisor 101 controls whether and how physical processor capabilities are presented to the virtual machine 106.

A control operating system 105 may execute at least one application for managing and configuring the guest operating systems. In one embodiment, the control operating system 105 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 101 executes the control operating system 105 within a virtual machine 106 created by the hypervisor 101. In still another embodiment, the control operating system 105 executes in a virtual machine 106 that is authorized to directly access physical resources on the computing device 100.

In one embodiment, the control operating system 105 executes in a virtual machine 106 that is authorized to interact with at least one guest operating system 110. In another embodiment, a guest operating system 110 communicates with the control operating system 105 via the hypervisor 101 in order to request access to a disk or a network. In still another embodiment, the guest operating system 110 and the control operating system 105 may communicate via a communication channel established by the hypervisor 101, such as, for example, via a plurality of shared memory pages made available by the hypervisor 101.

In some embodiments, the control operating system 105 includes a network back-end driver for communicating directly with networking hardware provided by the computing device 100. In one of these embodiments, the network back-end driver processes at least one virtual machine request from at least one guest operating system 110. In other embodiments, the control operating system 105 includes a block back-end driver for communicating with a storage element on the computing device 100. In one of these embodiments, the block back-end driver reads and writes data from the storage element based upon at least one request received from a guest operating system 110.

In one embodiment, the control operating system 105 includes a tools stack 104. In another embodiment, a tools stack 104 provides functionality for interacting with the hypervisor 101, communicating with other control operating systems 105 (for example, on a second computing device 100b), or managing virtual machines 106b, 106c on the computing device 100. In another embodiment, the tools stack 104 includes customized applications for providing improved management functionality to an administrator of a virtual machine farm. In some embodiments, at least one of the tools stack 104 and the control operating system 105 include a management API that provides an interface for remotely configuring and controlling virtual machines 106 running on a computing device 100. In other embodiments, the control operating system 105 communicates with the hypervisor 101 through the tools stack 104.

In one embodiment, the hypervisor 101 executes a guest operating system 110 within a virtual machine 106 created by the hypervisor 101. In another embodiment, the guest operating system 110 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 110, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 101; in such an embodiment, the driver is typically aware that it executes within a virtualized environment.

Figure 1B:
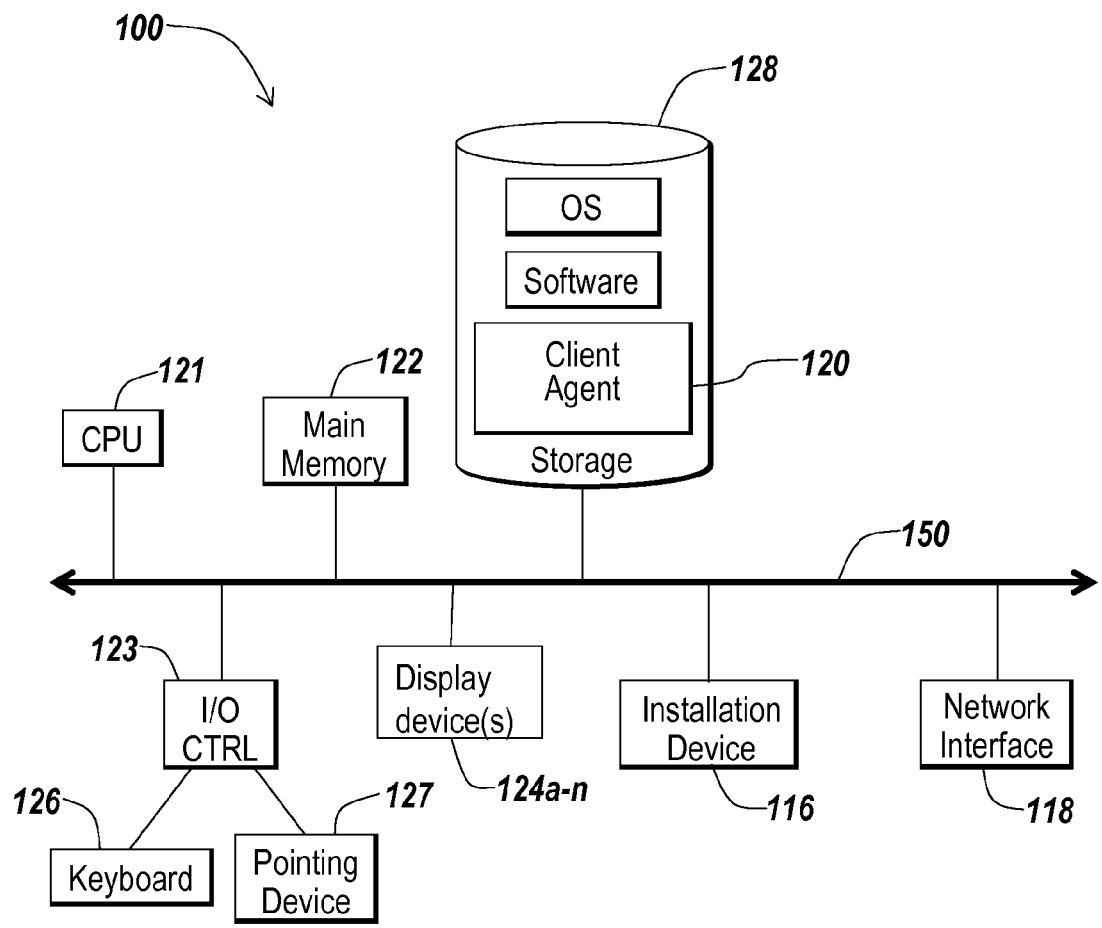
FIGS. 1B and 1C are block diagrams depicting embodiments of computing devices useful in connection with the methods and systems described herein.
Figure 1C:
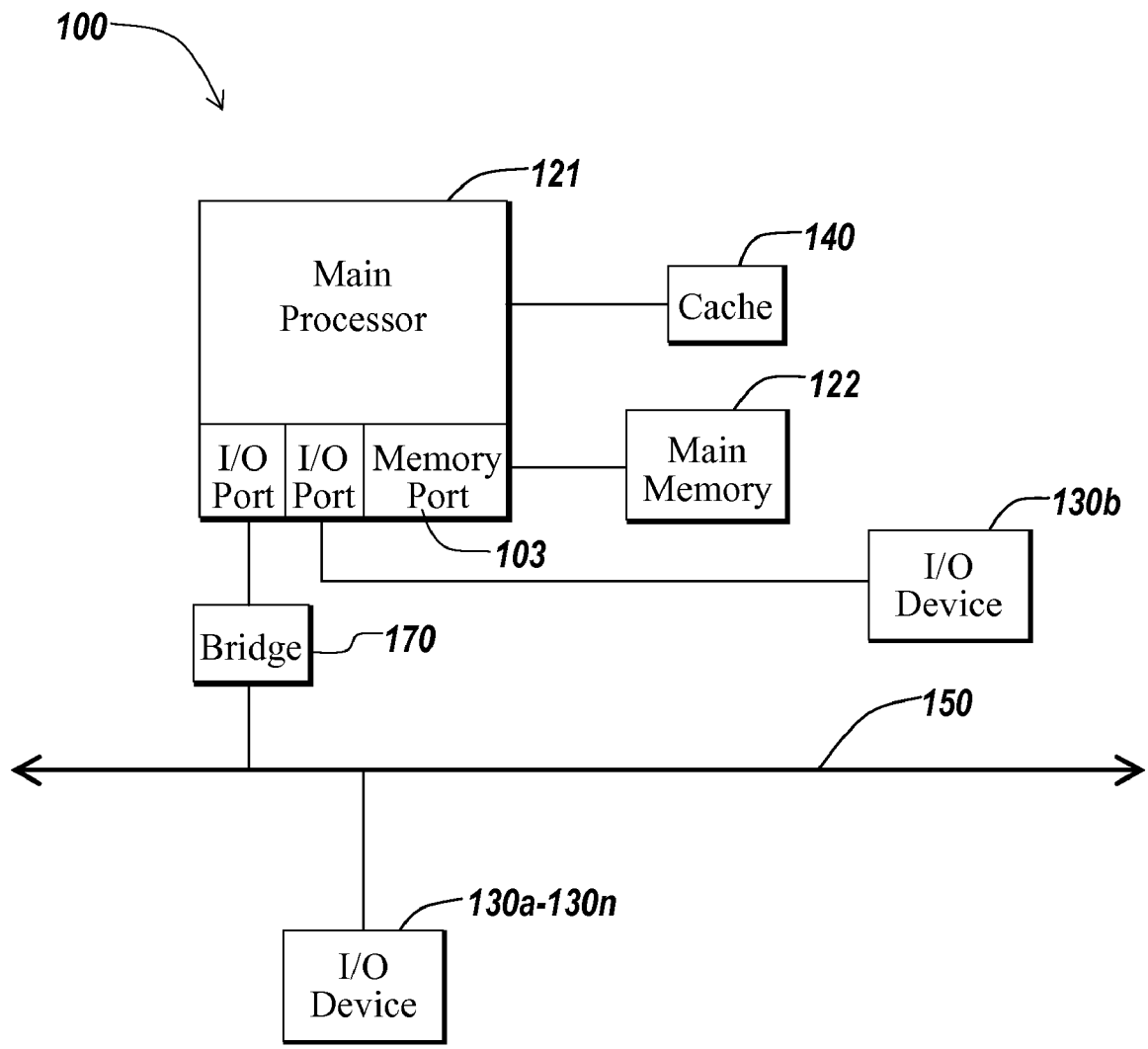

In another embodiment, the guest operating system 110, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 105, as described above The computing device 100 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of methods and systems described herein. As shown in FIGS. 1B and 1C, a computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and a client agent 120. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs such as any program related to the client agent 120. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments, the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a smartphone, for example, an iPhone manufactured by Apple Computer, or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 are web-enabled and can receive and initiate phone calls. In other embodiments, the communications device 100 is a Motorola RAZR or Motorola ROKR line of combination digital audio players and mobile phones.

A computing device 100 may be a file server, application server, web server, proxy server, appliance, network appliance, gateway, application gateway, gateway server, virtualization server, deployment server, SSL VPN server, or firewall. In some embodiments, a computing device 100 provides a remote authentication dial-in user service, and is referred to as a RADIUS server. In other embodiments, a computing device 100 may have the capacity to function as either an application server or as a master application server. In still other embodiments, a computing device 100 is a blade server.

In one embodiment, a computing device 100 may include an Active Directory. The computing device 100 may be an application acceleration appliance. For embodiments in which the computing device 100 is an application acceleration appliance, the computing device 100 may provide functionality including firewall functionality, application firewall functionality, or load balancing functionality. In some embodiments, the computing device 100 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In other embodiments, a computing device 100 may be referred to as a client node, a client machine, an endpoint node, or an endpoint. In some embodiments, a client 100 has the capacity to function as both a client node seeking access to resources provided by a server and as a server node providing access to hosted resources for other clients.

In some embodiments, a first, client computing device 100a communicates with a second, server computing device 100b. In one embodiment, the client communicates with one of the computing devices 100 in a farm 38. Over the network, the client can, for example, request execution of various applications hosted by the computing devices 100 in the farm 38 and receive output data of the results of the application execution for display. In one embodiment, the client executes a program neighborhood application to communicate with a computing device 100 in a farm 38.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

Figure 2A:
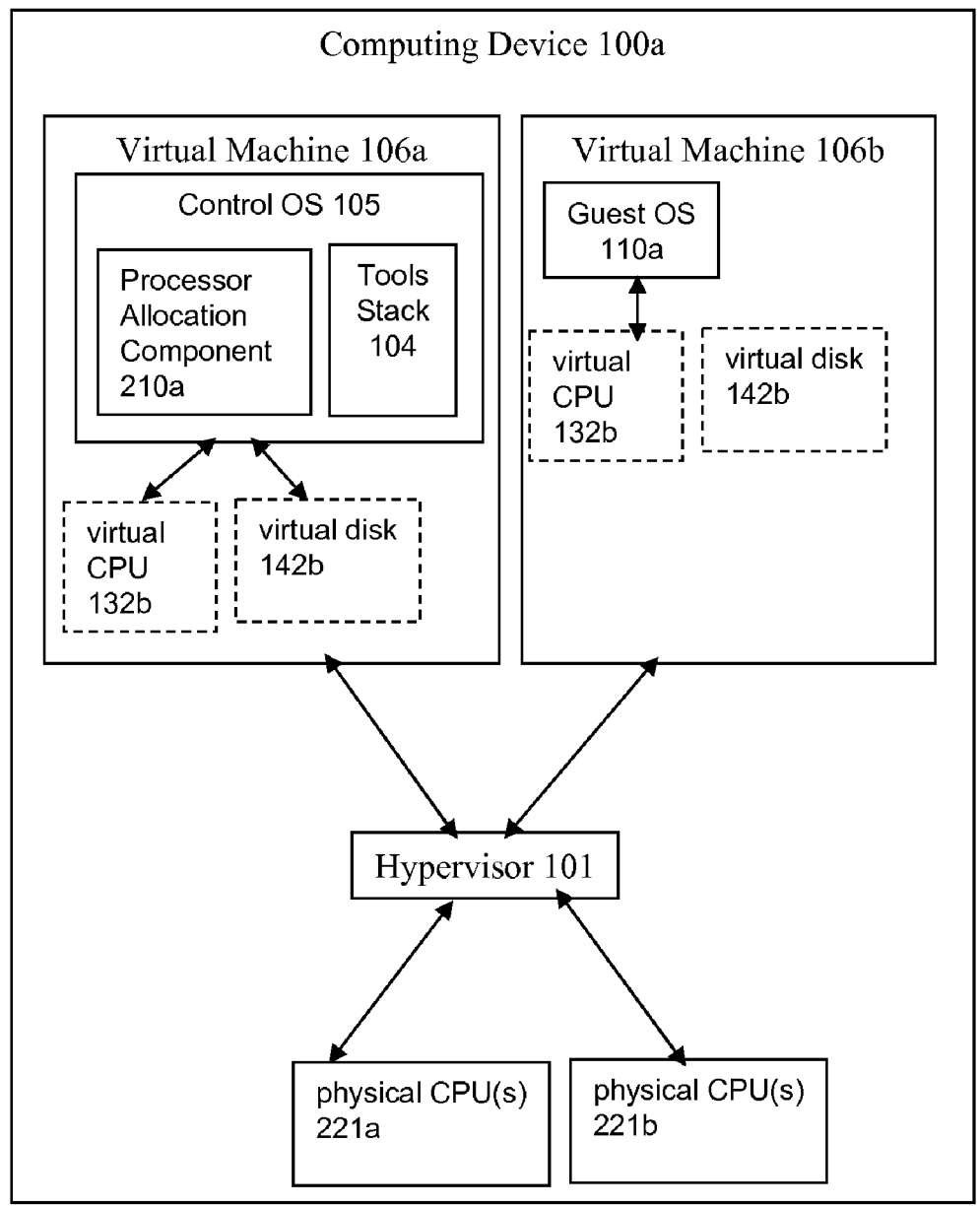
FIG. 2A is a block diagram depicting an embodiment of a system for facilitating virtualization of a heterogeneous processor pool.

Referring now to FIG. 2A, a block diagram depicts one embodiment of a system for facilitating virtualization of a heterogeneous processor pool. In brief overview, the system includes a control operating system 105 executing within a virtual machine 106a, a guest operating system 110 executing within a virtual machine 106b, a virtual CPU 132, a hypervisor 101, a processor allocation component 210, and a plurality of physical processors 221a, 221b (generally 221). The processor allocation component 210 identifies a plurality of physical processors available for computing and determines a set of flags, each of the set of flags identifying a type of functionality provided by each of a subset of the plurality of physical processors, the processor allocation component 210 executing on a host computer. The hypervisor 101, executing on the host computer and in communication with the processor allocation component 210, allocates, to at least one virtual machine, access to one of the subset of the plurality of physical processors. The hypervisor 101 executes in the hypervisor layer of the computing device 100. In some embodiments, the processor allocation component 210 executes in the hypervisor layer of the computing device 100. In other embodiments, the processor allocation component 210 executes on the control operating system 105, in the virtualization layer of the computing device 100. In further embodiments, computer readable media is provided including executable code for facilitating virtualization of a heterogeneous processor pool.

In some embodiments, the control operating system 105 identifies a subset of the functionality available from each of the plurality of physical processors 221. In one of these embodiments, the subset is less than the complete set of functionality available from at least one of the physical processors. In another of these embodiments, by providing the virtual machine with a listing of functionality that is a common subset available across all of the physical processors, this approach ensures that regardless of which of the physical processors is assigned to a virtual machine, the allocated physical processor can provide the functionality requested by the virtual machine. In some embodiments, the resources include physical processors 221 available for use by virtual machines 106. In other embodiments, however, the resources may include any resources, physical or logical, processor or otherwise, made available by a computing device 100.

Referring now to FIG. 2A, and in greater detail, the processor allocation component 210 identifies a plurality of physical processors available for computing and determines a set of flags, each of the set of flags identifying a type of functionality provided by each of a subset of the plurality of physical processors. In one embodiment, the processor allocation component 210 is a component executing within the hypervisor 101. In another embodiment, the processor allocation component 210 is a component executing within the hypervisor layer and in communication with the hypervisor 101. In still another embodiment, the processor allocation component 210 is a component executing within the control operating system 105, which may execute within a virtual machine 106. In yet another embodiment, the processor allocation component 210 is provided as part of an enterprise management applications programming interface; for example, the XEN API provided as part of a control operating system 105 in communication with a XEN hypervisor, or as part of the XEN SERVER line of products provided by Citrix Systems, Inc., of Fort Lauderdale, Fla. In some embodiments, the processor allocation component 210 includes a receiver for receiving data from the control operating system 105. In one of these embodiments, the control operating system 105 identifies the plurality of physical processors available for computing and transmits the identification to the processor allocation component 210. In other embodiments, the tools stack 104 within the control operating system 105 identifies the plurality of physical processors available for computing and transmits the identification to the processor allocation component 210. In still other embodiments, and as described in greater detail below in connection with FIGS. 2B and 2C, the processor allocation component 210 communicates, via the control operating system 105 and the hypervisor 101, with a computing device 100b to retrieve an identification of an available plurality of physical processors provided by the computing device 100b.

In one embodiment, the plurality of physical processors includes a physical processor 221. In another embodiment, the plurality of physical processors includes a physical processor 121, as described above in connection with FIG. 1B-1C. In still another embodiment, the plurality of physical processors includes at least one microprocessor. In still even another embodiment, the plurality of physical processors is distributed across a plurality of physical machines. In yet another embodiment, one of the plurality of physical processors supports a superset of the determined set of flags.

A physical processor in the plurality of physical processors maintains a register storing at least one processor flag; the register may be referred to as a flag register or status register. A processor flag may store an identification of functionality provided by the processor. In one embodiment, for example, and without limitation, a flag may identify an extension to functionality providing multimedia support provided by a type of processor, such as the "3DNOW" or "3DNOWEXT" flags identifying that the processor includes a multimedia extension created by Advanced Micro Devices, Inc., (AMD) of Sunnyvale, Calif. In another embodiment, as an example, and without limitation, a flag may identify that a processor provides parallel execution functionality, such as the HTT/HT hyper-threading flag which indicates that a processor provided by Intel Corporation of Santa Clara, Calif., provides technology to allow quasi-parallel execution of different instructions on a single processor.

The hypervisor 101, executing on the host computer and in communication with the processor allocation component 210, allocates, to at least one virtual machine, access to one of the subset of the plurality of physical processors. In some embodiments, a virtual machine provided by a hypervisor 101 queries the hypervisor 101 during an initialization process to identify allocated physical resources. In one of these embodiments, the virtual machine does not typically query the hypervisor 101 for the identification of allocated physical resources after the initialization process. In another of these embodiments, a resource executing within the virtual machine (such as an operating system or application) begins execution after the initialization process and requests access to functionality provided by a virtual resource. In still another of these embodiments, the virtual machine accesses an allocated physical resource in order to provide the executing resource with access to the requested functionality, and uses the identification of allocated physical resources to determine whether or not the requested functionality is available. In still even another of these embodiments, if the virtual machine has migrated to a second computing device after the initialization process, since the virtual machine has not queried the hypervisor for an update to the identification of the allocated physical resources, should the second computing device not provide originally-identified resources, the virtual machine may attempt to provide access to functionality that is no longer available. Therefore, in some embodiments, the methods and systems described herein allow a hypervisor 101 to provide to a virtual machine an identification of allocated functionality that will be available regardless of whether the virtual machine is later migrated from a first computing device to a second computing device, because the hypervisor 101 only identifies functionality that is common across each of the plurality of computing devices.

Figure 2B:
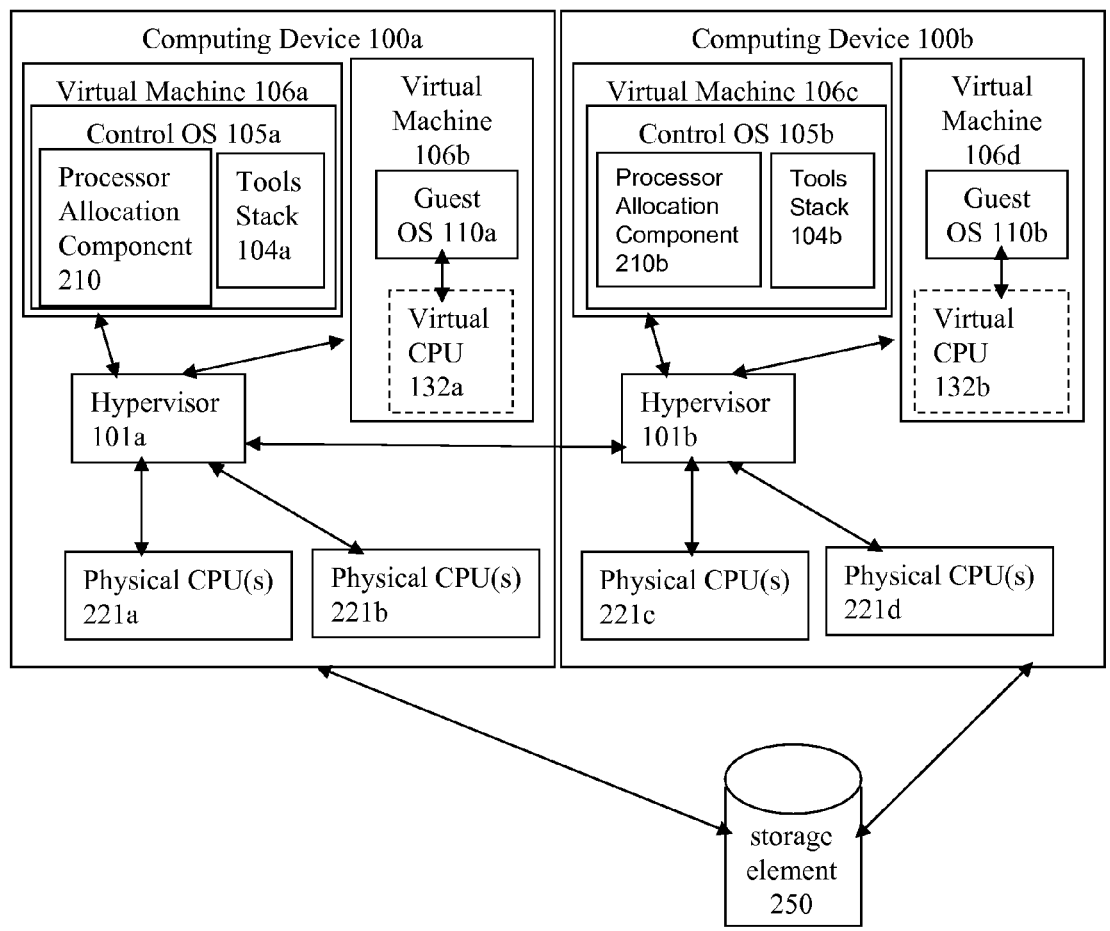
FIG. 2B is a block diagram depicting an embodiment of a system for facilitating virtualization of a heterogeneous processor pool provided by a plurality of physical computing devices.

Referring now to FIG. 2B, a block diagram depicts an embodiment of a system for facilitating virtualization of a heterogeneous processor pool provided by a plurality of physical computing devices. As shown in FIG. 2B, the system includes multiple computing devices 100, each of which makes at least one physical processor 221 available for computing. A control operating system 105a on a computing device 100a may exchange data with control operating system 105b on a computing device 100b, via communications between a hypervisor 101a and a hypervisor 101b. In one embodiment, a control operating system 105a may provide to the control operating system 105b an identification of at least one physical processor provided by the computing device 100a that is available for use by a virtual machine 106 executing on the computing device 100b. In some embodiments, rather than communicate with the control operating system 105b via the hypervisors 101, the control operating system 105a may store an identification of available physical processors in a storage element 250, which is accessible by the control operating system 105b. Although only two computing devices 100a and 100b and one storage element 250 are depicted in FIG. 2B, it should be understood that the system may provide multiple ones of any or each of those components.

As described in connection with FIG. 2B, a control operating system 105a on a computing device 100a may exchange data with control operating system 105b on a computing device 100b, via communications between a hypervisor 101a and a hypervisor 101b. In this way, one or more computing devices 100 may exchange data with one or more of the other computing devices 100 regarding processors and other physical resources available in a pool of resources. In one such embodiment, each computing device 100 maintains data associated with each of the other computing devices 100, including an identification of at least one physical processor provided by each of the computing devices 100 that is available for use by a virtual machine 106 executing on another computing device 100. In another embodiment, the system identifies a plurality of physical processors distributed across a plurality of physical machines 100.

Figure 2C:
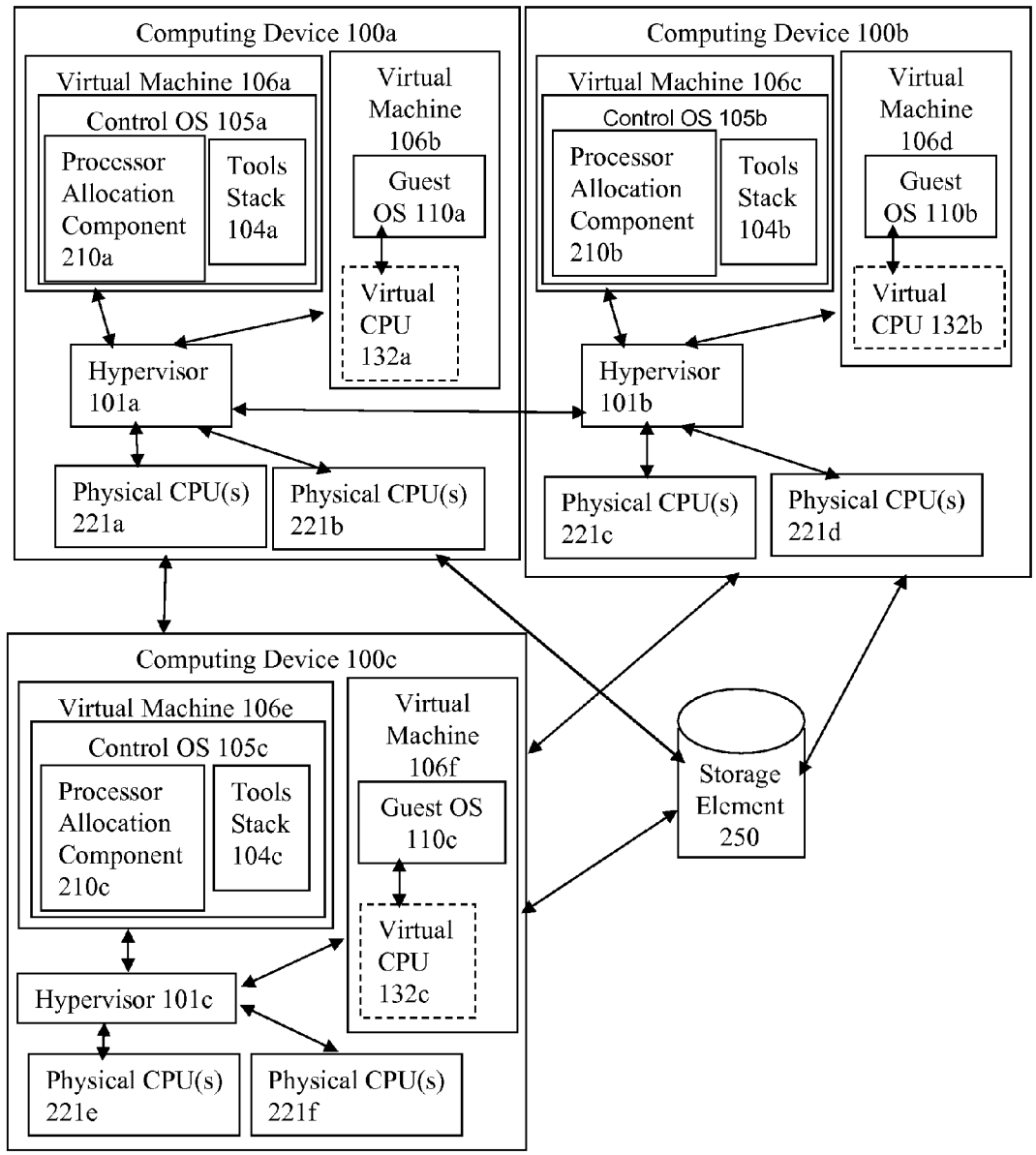
FIG. 2C is a block diagram depicting an embodiment of a system for facilitating virtualization of a heterogeneous processor pool provided by a plurality of physical computing devices including a master computing device.

Referring now to FIG. 2C, a block diagram depicts an embodiment of a system for facilitating virtualization of a heterogeneous processor pool provided by a plurality of physical computing devices including a master computing device.

In some embodiments, the plurality of physical computing devices 100 may communicate over a network, such as a local-area network (LAN), such as a company Intranet, a metropolitan area network (MAN), or a wide area network (WAN), such as the Internet or the World Wide Web. In some embodiments, there are multiple networks between the computing devices 100. The network may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may comprise a wireless link, such as an infrared channel or satellite band. The topology of the network may be a bus, star, or ring network topology. The network and network topology may be of any such network or network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In one embodiment, the system may include multiple, logically-grouped computing devices 100. In these embodiments, the logical group of servers may be referred to as a farm 38 or as a pool of computing devices 100. In some of these embodiments, the computing devices 100 may be geographically dispersed. In some cases, a farm 38 may be administered as a single entity. In other embodiments, the server farm 38 comprises a plurality of server farms 38. In one embodiment, the server farm executes one or more applications on behalf of one or more client computing devices.

The computing devices 100 within each farm 38 can be heterogeneous. One or more of the computing devices 100 can operate according to one type of operating system platform (e.g., WINDOWS NT, manufactured by Microsoft Corp. of Redmond, Wash.), while one or more of the other computing devices 100 can operate on according to another type of operating system platform (e.g., Unix or Linux).

The computing device 100 of each farm 38 may not need to be physically proximate to another server 106 in the same farm 38. Thus, the group of servers 106 logically grouped as a farm 38 may be interconnected using a wide-area network (WAN) connection or a metropolitan-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

As shown in FIG. 2C, the system includes multiple computing devices 100, each of which makes at least one physical processor 221 available for computing and one of which has been designated as a master computing device. In contrast to the embodiment depicted in FIG. 2B, in which each control operating system 105b on each computing device 100a transmits data to each control operating system 105b, FIG. 2C depicts an embodiment in which control operating systems 105a and 105b communicate with the master computing device 100c and its control operating system 105c. In this embodiment, the master computing device 100c maintains a unified view of resources available for use by each computing device 100 in a pool of computing devices. In some embodiments, the master computing device 100c compiles an enumeration of resources available throughout the pool of computing devices and determines a common subset of resources available across the pool. In other embodiments, the master computing device 100c compiles an enumeration of functionality provided by a type of resource made available by each computing device in the pool of computing devices (for example, by enumerating the functionality provided by each physical processor made available by each computing device 100) and determines a common subset of functionality made available by resources in the pool. In some embodiments, the computing devices 100 in a plurality of computing devices 100 elect one of the computing devices to provide the functionality of a master computing device 100c. In other embodiments, the computing devices 100 in a plurality of computing devices 100 elect a subset of the computing devices to provide the functionality of a master computing device. In still other embodiments, the computing devices 100 exchange state data with the master computing device 100c to provide each computing device 100 with a snapshot of data stored by the master computing device 100c; in this embodiment, should the master computing device 100c fail and another computing device 100n be elected as a new master computing device, the newly-elected computing device 100n may access the snapshot of data to reduce the impact of the failover process.

Figure 3:
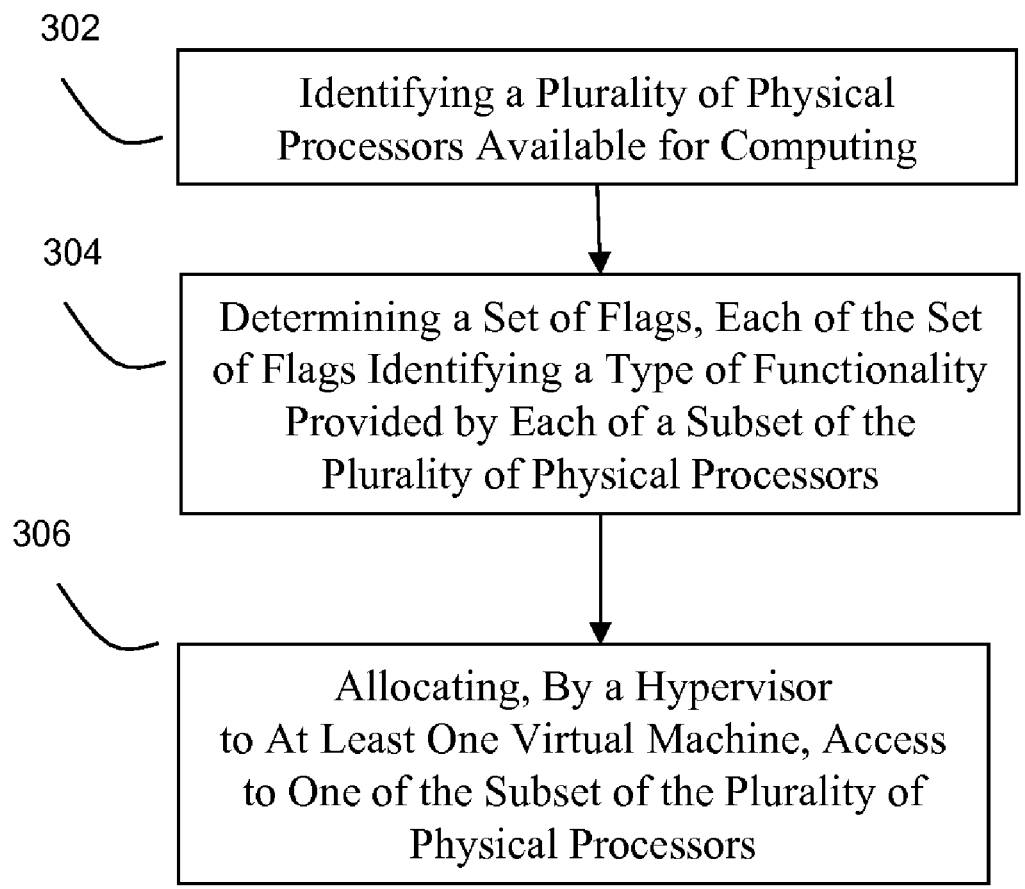
FIG. 3 is a flow diagram depicting an embodiment of a method for facilitating virtualization of a heterogeneous processor pool.

Referring now to FIG. 3, a flow diagram depicts one embodiment of a method for facilitating virtualization of a heterogeneous processor pool. In brief overview, the method includes identifying a plurality of physical processors available for computing (302). The method includes determining a set of flags, each of the set of flags identifying a type of functionality provided by each of a subset of the plurality of physical processors (304). The method includes allocating, by a hypervisor to at least one virtual machine, access to one of the subset of the plurality of physical processors (306).

Referring now to FIG. 3, and in greater detail, a plurality of physical processors available for computing are identified (302). In one embodiment, a processor allocation component 210 identifies the plurality of physical processors available for computing. In another embodiment, the hypervisor 101 identifies the plurality of physical processors available for computing. In still another embodiment, a control operating system 105 queries the hypervisor to identify any physical resources made available by the computing device 100 and the control operating system 105 transmits the identified physical resources to the processor allocation component 210. In yet another embodiment, a tools stack 104 provides functionality for querying the hypervisor and transmits to the processor allocation component 210 the identified physical resources. In some embodiments, the tools stack 104 queries a kernel on the computing device 100 to identify a plurality of physical processors available for computing.

A set of flags is determined, each of the set of flags identifying a type of functionality provided by each of a subset of the plurality of physical processors (304). In one embodiment, the set of flags is a subset of a set of flags; for example, a superset of flags may include flags identifying functionality provided by only one of the physical processors 221a as well as flags identifying functionality provided by both the physical processor 221a and a second physical processor 221d, and the set may include only the flags identifying the functionality provided by both of the physical processors 221a and 221d. In another embodiment, an entire superset of flags identifies functionality provided by each of a plurality of physical microprocessors; in such an embodiment, the set may include all of the flags.

In some embodiments, a control operating system 105c on a master computing device 100c receives, from a control operating system 105a, a set of flags identifying functionality provided by a physical processor 221a available on a computing device 100a and the master computing device 100c receives, from a control operating system 105b, a set of flags identifying functionality provided by a physical processor 221b available on a computing device 100b. A component executing within the control operating system 105c—such as the process allocation component 210c—may determine a common set of functionality provided by both the physical processor 221a and the physical processor 221b; the common set may be the entire combined set of flags or a subset of the combined sets of flags. The control operating system 105c may, for example, transmit the determined common set of flags to a control operating system 105b on the computing device 100b for use in allocating resources to a virtual machine 106b that may eventually migrate from the computing device 100b to the computing device 100a. In some embodiments, when a new computing device 100d is added to or removed from the pool of computing devices, or when a new physical processor 221 becomes available or is no longer available, the control operating system 105c determines an updated set of flags and transmits the updated set of flags to each of the computing devices 100 in the pool of computing devices.

In other embodiments, a control operating system 105a on the computing device 100a and a control operating system 105b on the computing device 100b communicate directly with each other instead of via a master computing device 100c. For example, as described above in connection with FIG. 2B, the control operating systems 105a, 105b may communicate through the hypervisors 101a, 101b, or exchange data via use of a storage element 250. In one of these embodiments, each control operating system 105 determines the set of flags.

A hypervisor allocates, to at least one virtual machine, access to one of the subset of the plurality of physical processors (306). In one embodiment, a hypervisor 101 receives, from a control operating system 105, an identification of the determined set of flags. In another embodiment, the hypervisor 101 receives the identification of the determined set of flags with an instruction to execute a virtual machine 106. In still another embodiment, the hypervisor 101 receives the identification of the determined set of flags with an instruction to allocate to a virtual processor within a virtual machine 106 access to a physical processor 221 within the subset of physical processors. In yet another embodiment, the hypervisor 101 provides the virtual processor in the at least one virtual machine, the virtual processor implementing only functionality identified by the set of flags. For example, the hypervisor 101 may generate a virtual processor 132 capable of providing, to a resource executing within the virtual machine 106 (such as a guest operating system 110) only the identified functionality.

In some embodiments, the hypervisor 101 intercepts a request by a component within the virtual machine 106 (such as the virtual processor 132 or the guest operating system 110) for access to functionality not identified by a flag in the determined set of flags and the hypervisor 101 responds to the request with an indication that the functionality is not available from the allocated physical processor. In one of these embodiments, the allocated physical processor in the subset of the plurality of physical processors does provide the requested functionality—for example, the physical processor may implement a functionality identified by a superset of the determined set of flags—but not all physical processors in the subset provide the functionality. Therefore, preventing the virtual machine 106 from accessing the functionality not available from all of the physical processors results in execution of a virtual machine 106 that may migrate between computing devices providing access to heterogeneous physical processors.

In some embodiments, the identification and determination occur as part of a process for executing a virtual machine 106. In one of these embodiments, for example, a control operating system 105 on a computing device 100 may retrieve an identification of a plurality of physical processors available from one or more computing devices 100, determine the set of flags identifying functionality provided by each of the plurality of physical processors, and instruct a hypervisor 101 on the computing device 100 to execute a virtual machine 106 and to allocate virtual resources to the virtual machine 106, the virtual resources implementing only the functionality identified by the subset of flags. In other embodiments, by determining a set of flags identifying functionality common across a plurality of a physical processors, and by allocating, to a virtual machine 106, access to only the identified functionality, the virtual machine 106 will not attempt to access functionality that is provided by a first physical processor on a first computing device but not by a second physical processor on a second computing device; in such an embodiment, the virtual machine 106 may be migrated between the two computing devices without errors arising from an attempt to access unsupported functionality.

In some embodiments, at least one of the plurality of physical processors provides additional functionality not identified by a flag in the determined set of flags. In one of these embodiments, by only providing access to the common subset of functionality made available by each of the plurality of physical processors—or each of a subset of the physical processors including the at least one physical processor providing the additional functionality—a virtual machine 106 allocated access to the at least one may not receive an identification of the additional functionality and may not utilize the additional functionality. In another of these embodiments, therefore, the system may provide a mechanism by which a user may choose whether a virtual machine 106 should be allocated access to the common set of functionality—improving ease of migration in environments in which the virtual machine 106 may migrate from one computing device to another—or whether the virtual machine 106 should be allocated access to all of the functionality provided by a particular physical processor, resulting in enhanced performance by the virtual machine 106 utilizing the additional functionality. In such an embodiment, the system determines the set of flags responsive to a command received from a user. In still another of these embodiments, a user, such as an administrator may select improved ease of migration for a first virtual machine 106a, while selecting improved performance for a second virtual machine 106b. In still even another embodiment, allowing a user to selectively apply the mechanisms described herein provides the user with greater control and flexibility in managing a plurality of virtual machines. In yet another embodiment, the system includes a user interface allowing the user to specify customized preferences for each virtual machine; for example, the control operating system 105 may provide the user interface.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for facilitating virtualization of a heterogeneous processor pool, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for facilitating virtualization of a heterogeneous processor pool, the method comprising:
    identifying a heterogeneous plurality of physical processors available for computing;
    determining a set of flags, each of the set of flags identifying a type of functionality provided by each of a subset of the plurality of physical processors;
    determining, from the set of flags, a common subset of functionality provided by all of the plurality of physical processors, the common subset of functionality less than a complete set of functionality available from at least one of the physical processors;
    allocating, by a hypervisor to at least one virtual machine, access to one of the subset of the plurality of physical processors; and
    providing, by the hypervisor, a virtual processor in the at least one virtual machine, the virtual processor implementing only the common subset of functionality.

2. The method of claim 1, wherein identifying further comprises identifying a plurality of physical processors distributed across a plurality of physical machines.

3. The method of claim 1, wherein determining the set of flags further comprises determining, in response to a command received from a user, the set of flags.

4. The method of claim 1, wherein allocating further comprises allocating, by a hypervisor to the at least one virtual machine, access to a physical processor in the subset of the plurality of physical processors, the physical processor implementing functionality identified by a superset of the determined set of flags.

5. Non-transitory computer readable media having instructions thereon that when executed provide a method for facilitating virtualization of a heterogeneous processor pool, the computer readable media comprising:
    instructions to identify a heterogeneous plurality of physical processors available for computing;
    instructions to determine a set of flags, each of the set of flags identifying a type of functionality provided by each of a subset of the plurality of physical processors;
    instructions to determine, from the set of flags, a common subset of functionality provided by all of the plurality of physical processors, the common subset of functionality less than a complete set of functionality available from at least one of the physical processors;
    instructions to allocate, by a hypervisor to at least one virtual machine, access to one of the subset of the plurality of physical processors; and
    instructions to provide a virtual processor in the at least one virtual machine, the virtual processor implementing only the common subset of functionality.

6. The non-transitory computer readable media of claim 5 further comprising instructions to identify a plurality of physical processors distributed across a plurality of physical machines.

7. The non-transitory computer readable media of claim 5 further comprising instructions to determine, in response to a command received from a user, the set of flags.

8. The non-transitory computer readable media of claim 5 further comprising instructions to allocate, by a hypervisor to the at least one virtual machine, access to a physical processor in the subset of the plurality of physical processors, the physical processor implementing functionality identified by a superset of the determined set of flags.

9. A system for facilitating virtualization of a heterogeneous processor pool, the system comprising:
- a processor allocation component identifying a heterogeneous plurality of physical processors available for computing, determining a set of flags, each of the set of flags identifying a type of functionality provided by each of a subset of the plurality of physical processors, and determining, from the set of flags, a common subset of functionality provided by all of the plurality of physical processors, the common subset of functionality less than a complete set of functionality available from at least one of the physical processors, the processor allocation component executing on a host computer; and
- a hypervisor executing on the host computer and, in communication with the processor allocation component, allocating, to at least one virtual machine, access to one of the subset of the plurality of physical processors and providing a virtual processor within the at least one virtual machine, the virtual processor implementing only the common subset of functionality.

10. The system of claim 9, wherein the processor allocation component executes within a virtual machine on the host computer.

11. The system of claim 9, wherein the processor allocation component further comprises means for receiving an identification of the plurality of physical processors from a control operating system executing within a virtual machine on the host computer.

12. The system of claim 9 further comprising a second host computer transmitting to the processor allocation component an identification of the determined set of flags.

13. The system of claim 9, wherein the processor allocation component further comprises means for identifying a plurality of physical processors distributed across a plurality of physical machines.

* * * * *